United States Patent [19]

Spisak

[11] 4,262,967
[45] Apr. 21, 1981

[54] WHEEL TRIM RETAINER

[76] Inventor: Edward G. Spisak, 35700 Oakwood La., Westland, Mich. 48185

[21] Appl. No.: 98,356

[22] Filed: Nov. 28, 1979

[51] Int. Cl.³ .................................................. B60B 7/00
[52] U.S. Cl. .............................. 301/37 R; 301/108 R; 24/73 HC
[58] Field of Search ............ 301/37 R, 37 TP, 37 PB, 301/37 B, 108 R; 24/73 HC, 73 B

[56] References Cited
U.S. PATENT DOCUMENTS 2,757,979  8/1956  Lyon .................................. 301/37 R
3,425,747  2/1969  Alfes et al. ........................ 301/37 R Primary Examiner—H. Grant Skaggs
Attorney, Agent, or Firm—Fisher, Gerhardt, Crampton & Groh

[57] ABSTRACT

A retainer for attaching a wheel trim assembly to the rim of a vehicle wheel wherein a ring has a plurality of uniformly spaced retainers and a plurality of centering elements with the retainers resisting axial displacement of the wheel trim from the wheel and the centering elements acting to center the wheel trim and absorb most of the loads transmitted from the wheel to the wheel trim.

7 Claims, 8 Drawing Figures

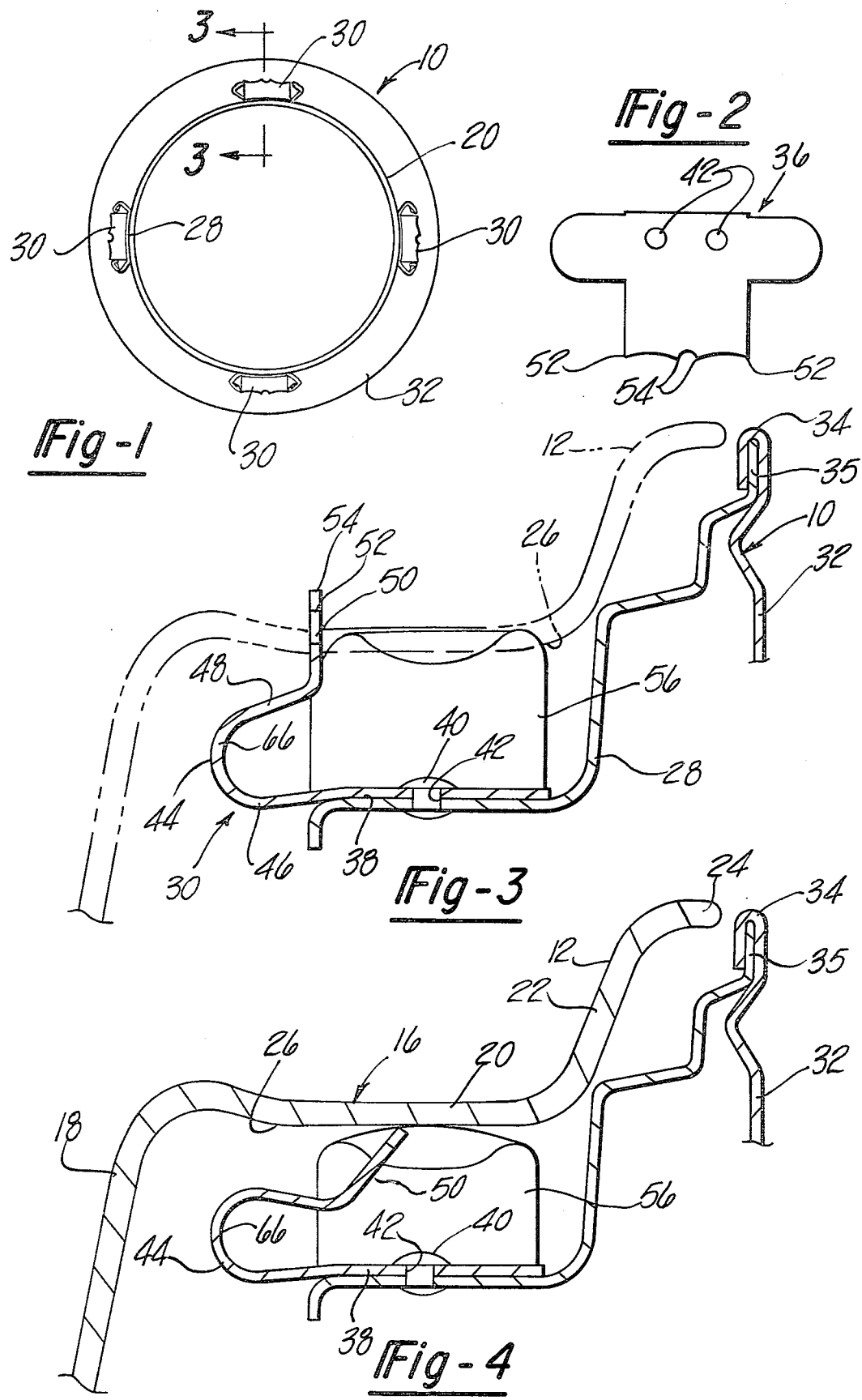

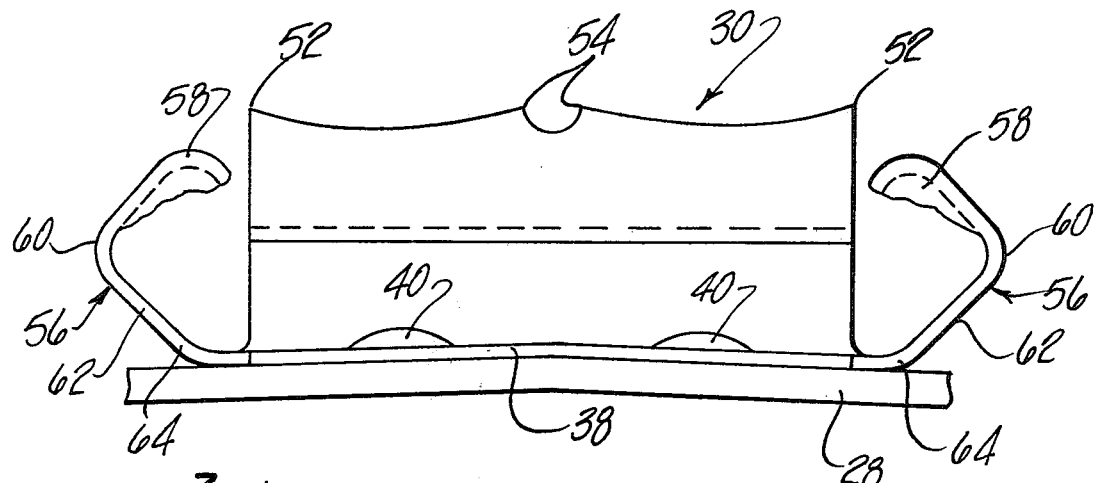
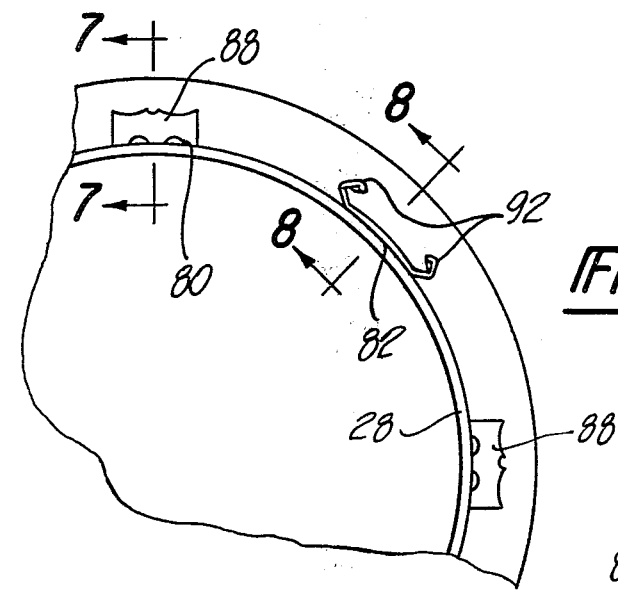
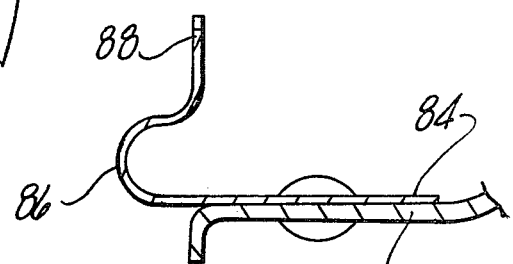
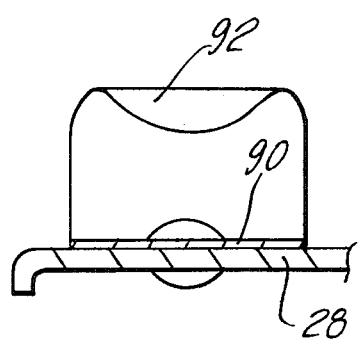

WHEEL TRIM RETAINER

This invention relates to a retainer for attaching wheel trim assemblies to vehicle wheels and more particularly to an improved retention arrangement for retaining the trim assembly on the wheel of the vehicle.

Wheel trim in the form of the wheel covers or decorative rings frequently are mounted on wheels of vehicles but are difficult to maintain in a mounted position because the wheels are subject to complex loads and stresses tending to temporarily deform the wheels as a result to applying the brakes, vehicle loading, turning of the vehicle on curves and vibrations and shocks from the road surface itself. A wheel trim assembly such as a cover or ring when mounted on the wheel also is subject to stresses and deflections which are transferred from the wheel to the wheel trim. Such load transfers are made through the retention system which normally include flexible members. The continuous flexing can result in fatigue and failure.

The wheels on which wheel trim assemblies are used are generally of standard configuration but have wide manufacturing tolerances which the wheel trim members and the retention systems must be able to accomodate.

These problems make it difficult to economically provide a wheel trim assembly which will firmly retain the trim assembly on the wheel during rough service and wide variations in manufacturing tolerances of both the wheel and the trim assembly.

It is an object of the invention to provide an improved wheel trim assembly with improved retaining means to firmly retain the trim assembly on the wheel in a centered relationship to the latter.

Another object of the invention is to provide a retention system for wheel trim assemblies which have separate portions for centering the wheel trim relative to the wheel and for preventing relative axial movement of the wheel and the wheel trim assembly.

These and other objects of the invention would be apparent from the following description and from the drawings in which:

FIG. 1 is a view of a wheel trim assembly embodying the invention as viewed from the back side of the assembly;

FIG. 2 is a plan view of an element of the assembly as it appears in an initial stage of manufacture;

FIG. 3 is a cross-sectional view at an enlarged scale taken on line 3—3 in FIG. 1;

FIG. 4 is a cross-sectional view similar to FIG. 3 showing the wheel trim assembly in its attached state on a vehicle wheel;

FIG. 5 is a view at an enlarged scale of a portion of the structure seen in FIG. 1;

FIG. 6 is a view of a segment of a wheel trim assembly similar to a portion of FIG. 1 but at an enlarged scale and showing another embodiment of the invention;

FIG. 7 is a cross-sectional view taken on line 7—7 in FIG. 6; and

FIG. 8 is a cross-sectional view taken on line 8—8 in FIG. 6.

A wheel trim assembly including an improved retainer embodying the invention is generally designated at 10 and is adapted for attachment to a standard vehicle wheel 12, only a portion of which is shown in the drawings.

Typically a vehicle wheel 12 has a tire supporting rim 16 with a radially extending side flange 18 merging with a generally axially extending intermediate flange 20. The intermediate flange 20 merges with a radially extending outer flange 22 which terminates in an axially outer lip portion 24. The intermediate flange 20 and radial outer flange 22 act to support one bead of a tire which is not shown. The intermediate flange 20 has a radially inner surface 26 that tapers or diverges outwardly at an angle of approximately 5 to 15 degrees and it is to this surface that the trim assembly of the present invention is attached and retained.

The assembly 10 includes a retaining ring 28 to which a plurality of retaining elements 30 are connected in uniformly spaced relationship to each other. Preferably a minimum of three retaining elements 30 are employed although, as shown in the drawings, an even number of retaining elements 30 may be disposed with pairs in diametrically opposed relationship to each other. It is the retaining elements 30 which engage the wheel 12 to hold the entire assembly 10 to the wheel 12.

The retaining ring 28 supports a wheel cover member 32 which may be made of decorative metal such as stainless steel or the like.

The wheel cover 32 is connected to the member 28 by means of folding the peripheral edge 34 of the metal cover 32 over the radial outer flange 35 of the retaining ring 38 as seen in FIGS. 3 and 4. If desired, the retaining ring 28 can be fastened to decorative wheel covers or rings of metal or plastic material by means of conventional fastening devices such as rivets or screws, for example.

The retaining elements 30 each are made of a single piece of material. The retaining elements 30 are made by forming a blank 36 as seen in FIG. 2 and subsequently bending the blank, as by stamping, into the configuration seen in FIGS. 3 and 5. Each element 30 includes a central base portion 38 which may be connected to the ring 28 as illustrated in the drawings, by a pair of rivets 40 disposed in openings 42 in the retaining element and ring 28. One edge of the base portion 38 merges with a U-shaped portion 44 which as seen in FIGS. 3 and 4 has one leg 46 merging with the base portion 38 and another leg 48 merging with a radially extending blade portion 50. As seen in FIG. 3 when the assembly 10 is detached from the wheel 12 of the vehicle, the blade portion 50 extends generally perpendicular to the base portion 38.

Referring to FIG. 5, the blade portion 50 is provided with a pair of outer teeth 52 and a pair of intermediate teeth 54, the points of which are on an arc conforming to the curvature of the inner circumferential surface 26 of the wheel 12. In the attached position of the assembly 10, all of the teeth 52 and 54 bitingly engage the wheel surface 26 as illustrated in FIG. 3.

Opposite ends of a base portion 38 are provided with a pair of centering elements 56. The centering elements 56 are mirror images of each other and each includes a generally spoon shaped end 58 which merges with a curved portion 60 formed between the arm forming the spoon shaped end 58 and an arm 62. The arm 62 merges with a second curved portion 64 extending into the base portion 38. The centering elements 56 flex at the curved portions 60 and 64 so that the spoon shaped ends 58 engage the inner surface 26 of the wheel rim 16 and act as cams to engage the surface 26 and guide the assembly into a centered position relative to the axis of the wheel 12.

Referring to FIG. 5 it will be noted that the teeth 52 and 54 are spaced radially outwardly a distance greater than the radial outer ends of the spoon shaped portions 58 when the retaining elements 30 are in their relaxed, unmounted condition which also is illustrated in FIG. 3. During attachment of the assembly 10 to the wheel 12, the blade portion 50 is deflected from the position illustrated in FIG. 3 to the position illustrated in FIG. 4 because of deflection which occurs about the curved bight 66 of the U-shaped portion 44. Similarly the ends of the spoon shaped portions 58 deflect or flex at the curved portions 60 and 64 as best seen in FIG. 5. In this regard it should be noted that the ends of the teeth 52 and 54 are spaced from the bight 66 about which flexing occurs a greater distance than the spacing of the spoon shaped portions 58 from the curved flexing areas indicated at 60 and 64. As a consequence, the centering elements 56 with the spoon shaped ends 58 resist deflection more than the blade portion 50 with its longer lever arm. Stated otherwise, the blade portion 50 is much more flexible relative to the base portion 38 than the relatively stiffer centering elements 56.

The wheel trim assembly 10 is attached to the wheel 12 of the vehicle by axially aligning the wheel assembly 10 which thereafter is moved axially inwardly. The blade portions 50 which extend radially outwardly the greatest distance will engage the wheel rim 16 at the juncture between the intermediate flange 20 and the outer flange 22. Continued inward axial movement of the wheel trim assembly 10 relative to the wheel 12 will increasingly deflect the blade portion 50 and the U-shaped portion 44 so that in the finally attached position illustrated in FIG. 2, the blade portion 50 is disposed at an angle to the intermediate flange 20 and is maintained resiliently in engagement with the surface 26. As the wheel assembly 10 is moved radially inwardly, and with the blade portions 50 partially deflected, the spoon shaped ends 58 of the centering elements 56 engage the wheel rim 16 and also are deflected but a lesser amount than the blade 50 to press against the surface 56. Because the centering elements 56 are substantially stiffer than the U-shaped portion 44 supporting the blade portion 50, deflection loads from the wheel 12 are absorbed by the centering elements 56 to relieve the load on the U-shaped portion 44 which otherwise would be subjected to fatigue that could result in permanent set or failure of the retaining function of the blade 50.

Another embodiment of the invention is illustrated in FIG. 6 in which the retaining and centering functions are provided by separate elements 80 and 82, respectively. The retaining element 80 has a base portion 84 similar to the base portion 38 of the element 30 for attachment to a retaining ring. The base portion 84 merges with a U-shaped portion 86 supporting a blade 88 identical with the blade 50 of the prior embodiment.

The centering element 82 has a mounting portion 90 adapted to be fastened to a retaining ring 28 and is provided with spoon shaped portions 92 merging with the base 90 in a manner similar to the spoon shaped portions 58 and the base portion 38 of the prior embodiment. In this embodiment of the invention the elements 80 are uniformly spaced circumferentially of the retaining ring 28 and the centering elements 82 are disposed intermediate each pair of adjacent elements 80.

Attachment of the assembly shown in the embodiment of FIGS. 6 through 8 is generally the same as in the prior embodiment. The blade portions 88 come into engagement with the wheel 12 first and subsequently the spoon portions 92 engage and center the assembly to the wheel 12. The centering elements 82 act to absorb loads that would otherwise be transfered of the wheel 12 to the retaining element 80 to increase the useful life of the latter.

Two embodiments of a retainer for attaching wheel trim assemblies to vehicle wheels has been provided and in each embodiment a blade portion is resiliently forced into biting engagement with the rim of a vehicle wheel to prevent axial displacement of the wheel trim assembly and wheel. In both embodiments, the deflection loads from the vehicle wheel are transmitted to the centering elements which not only serve to absorb deflection loads but also maintain the wheel trim assembly in a centered relationship relative to the wheel so that the retaining blade portions are substantially uniformly deflected. The arrangement increases the life of the retaining elements by using the centering elements to isolate the blade portions from high frequency deflection loads.

The embodiments of the invention in which an exclusive property or privilege is claimed are defined as follows:

1. A retainer for attaching a wheel trim assembly to an axially extending flange adjacent the outer circumferential lip of a vehicle wheel comprising; a retainer ring, a plurality of retainer means uniformly spaced circumferentially of said ring, each of said retainer means including a base member attached to said ring and merging with a U-shaped portion open axially outwardly of said wheel, a blade extending radially outwardly from an end of a leg of said U-shaped portion and having an edge portion bitingly engagable with said flange of said wheel, a plurality of centering elements supported on said ring in uniformly spaced relation to each other and extending radially outwardly from said ring a distance less than said edge portions of said blades, said centering elements each including a pair of arms joined together for relative deflection about a first curved portion therebetween and wherein one of said arms is supported relative to said ring for deflection about a second curved portion, said blades and said centering elements being engagable with uniformly spaced portions of said flange upon deflection of said blade portion radially inwardly a distance greater than the radial deflection of said centering elements.

2. The retainer of claim 1 wherein said U-shaped portion is deflectable under a lesser load than said centering elements.

3. The retainer of claim 1 wherein said centering elements require a greater load for unit of deflection than said blades and U-shaped portions.

4. A combination of claim 1 wherein said centering elements are deflectable about portions more closely spaced to the point of contact of said centering elements with the flange of said wheel than the spacing of the points of contact of said blade portions with said flange from said U-shaped portion.

5. The retainer of claim 1 wherein said centering elements each have a spoon shaped end resiliently supported relative to said ring to slidably engage said flange of said wheel during mounting and removal of said wheel trim assembly to and from said wheel.

6. The retainer of claim 1 wherein said centering elements extend from said base at circumferentially opposite sides of said blade.

7. A retainer for attaching a wheel trim assembly to an axially extending flange adjacent the rim of a vehicle wheel comprising; a retainer ring, a plurality of retainer means uniformly spaced circumferentially of said ring, each of said retainer means including a base member attached to said ring and merging with a U-shaped portion open axially outwardly of said wheel, a blade extending radially outwardly from an end of a leg of said U-shaped portion and having an edge portion bitingly engagable with said flange of said wheel, a plurality of centering elements supported on said ring in uniformly spaced relation to each other and extending radially outwardly from said ring a distance less than said edge portions of said blades, a mounting portion adapted to be connected to said ring, said pair of centering elements supported from opposite ends of said mounting portions, said mounting portions being disposed in uniformly spaced relationship to each other and to adjacent base portions supporting said blades, said blades and said centering elements being engagable with uniformly spaced portions of said flange upon deflection of said blade portion radially inwardly a distance greater than the radial deflection of said centering elements.

* * * * *